United States Patent
Kao

(10) Patent No.: US 10,054,478 B2
(45) Date of Patent: Aug. 21, 2018

(54) IDENTIFICATION SYSTEM AND METHOD FOR IDENTIFYING AN OBJECT

(71) Applicant: Wistron Corporation, New Taipei (TW)

(72) Inventor: Yi-Sheng Kao, New Taipei (TW)

(73) Assignee: Wistron Corporation, New Taipei (TW)

( * ) Notice: Subject to any disclaimer, the term of this patent is extended or adjusted under 35 U.S.C. 154(b) by 1121 days.

(21) Appl. No.: 14/010,536

(22) Filed: Aug. 27, 2013

(65) Prior Publication Data
US 2014/0278204 A1  Sep. 18, 2014

(30) Foreign Application Priority Data

Mar. 12, 2013  (TW) .............................. 102108655 A

(51) Int. Cl.
| | | |
|---|---|---|
| *G01G 19/414* | (2006.01) | |
| *G01N 5/00* | (2006.01) | |
| *G01G 17/04* | (2006.01) | |

(52) U.S. Cl.
CPC ........... *G01G 19/414* (2013.01); *G01G 17/04* (2013.01); *G01G 19/4144* (2013.01); *F25D 2700/06* (2013.01)

(58) Field of Classification Search
CPC .... G06F 3/0414; G06F 1/1626; G06F 3/0488; G06K 9/00; G06K 9/00577;
(Continued)

(56) References Cited

U.S. PATENT DOCUMENTS

| | | | | |
|---|---|---|---|---|
| 2004/0095380 A1* | 5/2004 | Bass | ................. | G06F 17/30398 715/738 |
| 2004/0148089 A1* | 7/2004 | Schmidt | ................ | G06F 3/0414 701/124 |

(Continued)

FOREIGN PATENT DOCUMENTS

| | | |
|---|---|---|
| TW | 201249374 | 12/2012 |
| TW | M442833 | 12/2012 |

OTHER PUBLICATIONS

Office action dated Jan. 28, 2015 for the Taiwan application No. 102108655, filing date: Mar. 12, 2013, p. 1 line 10~14, p. 2~10 and p. 11 line 1~8.

*Primary Examiner* — Roy Y Yi
*Assistant Examiner* — Jeffrey Aiello
(74) *Attorney, Agent, or Firm* — Winston Hsu

(57) ABSTRACT

An identification system includes a plurality of sensing units, a storage module, a computing unit and an identification unit. The plurality of sensing units is for sensing a plurality of pressure values of a plurality of pressure points of a first object disposed on the plurality of sensing units. The storage module is for storing a set of characteristic information of a second object. The computing unit is electrically connected to the plurality of sensing units and for computing at least three distance characteristic values and at least three angle characteristic values after receiving the plurality of pressure values. The identification unit is electrically connected to the storage module and the computing unit for comparing the set of characteristic information with the at least three distance characteristic values and the at least three angle characteristic values, so as to indentify whether the first object corresponds to the second object.

18 Claims, 5 Drawing Sheets

(58) Field of Classification Search
CPC .. F25D 2700/06; G01G 17/04; G01G 19/414; G01G 19/4144
USPC .......................... 345/173; 702/85, 138, 152
See application file for complete search history.

(56) References Cited

U.S. PATENT DOCUMENTS

| | | | | |
|---|---|---|---|---|
| 2004/0215402 | A1* | 10/2004 | Hsiung | G01N 33/0031 702/22 |
| 2004/0249843 | A1* | 12/2004 | Damrath | G06Q 20/204 |
| 2006/0115140 | A1* | 6/2006 | Nakamura | G07D 5/005 382/136 |
| 2009/0154780 | A1* | 6/2009 | Jang | G06F 21/32 382/125 |
| 2010/0037709 | A1* | 2/2010 | Yeh | G01L 1/205 73/862.046 |
| 2010/0066697 | A1* | 3/2010 | Jacomet | G06F 3/0414 345/173 |
| 2011/0025876 | A1* | 2/2011 | Denzler | G06F 17/30256 348/222.1 |
| 2012/0139944 | A1* | 6/2012 | Kuriya | G06F 3/038 345/649 |
| 2013/0207920 | A1* | 8/2013 | McCann | G06F 3/0488 345/173 |
| 2014/0009433 | A1* | 1/2014 | Chen | G06F 3/044 345/174 |
| 2014/0187907 | A1* | 7/2014 | Duan | A61B 5/062 600/409 |
| 2015/0168238 | A1* | 6/2015 | Raut | G01N 27/048 702/42 |
| 2015/0320352 | A1* | 11/2015 | Ben Shalom | A61B 5/1036 600/587 |

* cited by examiner

IDENTIFICATION SYSTEM AND METHOD FOR IDENTIFYING AN OBJECT

BACKGROUND OF THE INVENTION

1. Field of the Invention

The present invention relates to an identification system and a method for identifying an object, and more specifically, to an identification system and a method for identifying an object by sensing pressure values.

2. Description of the Prior Art

With the advancement of technology, smart appliances bring people with convenience of living. For example, the smart refrigerator can assist a user in managing food. The refrigerator is an important household appliance in the living for storing goods, such as food and beverages, in a low temperature. However, too many goods are often stored in a conventional refrigerator, and the user cannot remember expiration dates of all goods in detail, so that a lot of goods are expired to be discarded, or some goods run out without being supplied in time. Therefore, it has to provide a system and a method for storing information of the goods, so as to prevent the goods from being expired to be discarded or running out without being supplied in time. A conventional method for storing information of the goods is to place barcodes capable of storing information on the goods. However, this method only can store initial information of the item as it is put in the refrigerator. That is, it only can notify the user that the goods are about to expire, but cannot notify the user that the goods are going to run out. In addition, it has to place a barcode storing information on every goods in the smart refrigerator to achieve a purpose of monitoring all goods, so that it spends too much time and cost. Therefore, it is an important issue about the smart appliances to design an identification system for identifying the goods and related information of the goods automatically.

SUMMARY OF THE INVENTION

The present invention is to provide an identification system and a method for identifying objects by sensing pressure values, to solve above problems.

According to the disclosure, the identification system includes a plurality of sensing units, a storage module, a computing unit and an identification unit. The plurality of sensing units are for sensing a plurality of pressure values of a plurality of pressure points of a first object disposed on the plurality of sensing units. The storage module is for storing a set of characteristic information of a second object. The computing unit is electrically connected to the plurality of sensing units for choosing at least three maximum pressure values of at least three maximum pressure points from the plurality of pressure values of the plurality of pressure points after receiving the plurality of pressure values of the first object, so as to calculate a circumcenter reference point of a triangle formed by the at least three maximum pressure points to generate at least three distance characteristic values and at least three angle characteristic values corresponding to the at least three maximum pressure points, wherein each distance characteristic value corresponds to a distance between each maximum pressure point and the circumcenter reference point, and each angle characteristic value corresponds to an angle included between lines connecting two adjacent maximum pressure points and the circumcenter reference point. The identification unit is electrically connected to the storage module and the computing unit for comparing the set of characteristic information with the at least three distance characteristic values and the at least three angle characteristic values, so as to indentify whether the first object corresponds to the second object.

According to the disclosure, the set of characteristic information comprises at least three predetermined distance characteristic values and at least three predetermined angle characteristic values, and the identification unit is further for comparing the at least three predetermined distance characteristic values with the at least three distance characteristic values and comparing the at least three predetermined angle characteristic values with the at least three angle characteristic values, so as to identify whether the first object corresponds to the second object.

According to the disclosure, the identification unit determines that the first object corresponds to the second object as a tolerance resulted from a comparison between the set of characteristic information, the at least three distance characteristic values, and the at least three angle characteristic values by the identification unit is less than a predetermined tolerance.

According to the disclosure, the set of characteristic information comprises at least three predetermined pressure values, and the identification unit is further for comparing the at least three predetermined pressure values with the at least three maximum pressure values, so as to identify weight variations of the first object, as the identification unit determines that the first object corresponds to the second object.

According to the disclosure, the identification system further includes an alert module electrically connected to the identification unit, and the alert module being for generating an alert message as a tolerance resulted from a comparison between the at least three predetermined pressure values with the at least three maximum pressure values by the identification unit is greater than a predetermined weight tolerance.

According to the disclosure, the identification unit determines that the first object does not correspond to the second object as a tolerance resulted from a comparison between the set of characteristic information with the at least three distance characteristic values and the at least three angle characteristic values by the identification unit is greater than a predetermined weight tolerance.

According to the disclosure, the identification system further includes an input module for inputting the set of characteristic information corresponding to the first object as the identification unit determines that the first object does not correspond to the second object.

According to the disclosure, the identification system further includes an input module for inputting the set of characteristic information corresponding to the first object.

According to the disclosure, the computing unit is for choosing five maximum pressure values of five maximum pressure points after receiving the plurality of pressure values of the first object, so as to calculate a circumcenter reference point of a triangle formed by outermost three maximum pressure points of the five maximum pressure points to generate five distance characteristic values and five angle characteristic values corresponding to the five maximum pressure points, wherein each distance characteristic value corresponds to a distance between each maximum pressure point and the circumcenter reference point, and each angle characteristic value corresponds to an angle included between lines connecting two adjacent maximum pressure points and the circumcenter reference point.

According to the disclosure, the set of characteristic information comprises five predetermined distance characteristic values and five predetermined angle characteristic values, and the identification unit is further for comparing the five predetermined distance characteristic values with the five distance characteristic values and comparing the five predetermined angle characteristic values with the five angle characteristic values, so as to identify whether the first object corresponds to the second object.

According to the disclosure, the plurality of sensing units is further for sensing a first set of the plurality of pressure values of the first object on a first time sequence and a second set of the plurality of pressure values of the first object on a second time sequence, and the computing unit is further for computing a difference between the first set of the plurality of pressure values and the second set of the plurality of pressure values, so as to determine whether to choose the at least three maximum pressure values of the at least three maximum pressure points from the second set of the plurality of pressure values of the plurality of pressure points.

According to the disclosure, the method for identifying an object includes a plurality of sensing units sensing a plurality of pressure values of a plurality of pressure points of a first object disposed on the plurality of sensing units; storing a set of characteristic information of a second object to a storage module; a computing unit choosing at least three maximum pressure values of at least three maximum pressure points from the plurality of pressure values of the plurality of pressure points; the computing unit calculating a circumcenter reference point of a triangle formed by the at least three maximum pressure points; the computing unit calculating at least three distance characteristic values and at least three angle characteristic values corresponding to the at least three maximum pressure points, wherein each distance characteristic value corresponds to a distance between each maximum pressure point and the circumcenter reference point, and each angle characteristic value corresponds to an angle included between lines connecting two adjacent maximum pressure points and the circumcenter reference point; an identification unit comparing the set of characteristic information with the at least three distance characteristic values and the at least three angle characteristic values; and the identification unit identifying whether the first object corresponds to the second object according to a comparison between the set of characteristic information, the at least three distance characteristic values, and the at least three angle characteristic values.

According to the disclosure, the set of characteristic information comprises at least three predetermined distance characteristic values and at least three predetermined angle characteristic values, the identification unit comparing the set of characteristic information with the at least three distance characteristic values and the at least three angle characteristic values comprises the identification unit comparing the at least three predetermined distance characteristic values of the set of characteristic information with the at least three distance characteristic values and comparing the at least three predetermined angle characteristic values of the set of characteristic information with the at least three angle characteristic values, and the identification unit identifies whether the first object corresponds to the second object according to the comparison between the set of characteristic information, the at least three distance characteristic values, and the at least three angle characteristic values comprises the identification unit identifies whether the first object corresponds to the second object according to a comparison between the three predetermined distance characteristic values with the at least three distance characteristic values and a comparison between the at least three predetermined angle characteristic values with the at least three angle characteristic values.

According to the disclosure, the identification unit identifying whether the first object corresponds to the second object according to the comparison between the set of characteristic information, the at least three distance characteristic values and the at least three angle characteristic values comprises the identification unit determining that the first object corresponds to the second object as a tolerance resulted from a comparison between the set of characteristic information, the at least three distance characteristic values, and the at least three angle characteristic values by the identification unit is less than a predetermined tolerance.

According to the disclosure, the set of characteristic information comprises at least three predetermined pressure values, and the method further comprises the identification unit comparing the at least three predetermined pressure values of the set of characteristic information with the at least three maximum pressure values, so as to identify weight variations of the first object as the identification unit determines that the first object corresponds to the second object.

According to the disclosure, the method further includes an alert module generating an alert message as a tolerance resulted from a comparison between the at least three predetermined pressure values with the at least three maximum pressure values by the identification unit is greater than a predetermined weight tolerance.

According to the disclosure, the identification unit identifying whether the first object corresponds to the second object according to the comparison between the set of characteristic information, the at least three distance characteristic values, and the at least three angle characteristic values comprises the identification unit determining that the first object does not correspond to the second object as a tolerance resulted from a comparison between the set of characteristic information with the at least three distance characteristic values and the at least three angle characteristic values by the identification unit is greater than a predetermined weight tolerance.

According to the disclosure, the plurality of sensing units sensing the plurality of pressure values of the plurality of pressure points of the first object disposed on the plurality of sensing units comprises the plurality of sensing units sensing a first set of the plurality of pressure values of the first object on a first time sequence and a second set of the plurality of pressure values of the first object on a second time sequence, and the method further includes the computing unit computing a difference between the first set of the plurality of pressure values and the second set of the plurality of pressure values; and the computing unit determining whether to choose the at least three maximum pressure values of the at least three maximum pressure points from the second set of the plurality of pressure values of the plurality of pressure points according to the difference.

According to the disclosure, the computing unit choosing the at least three maximum pressure values of the at least three maximum pressure points from the plurality of pressure values of the plurality of pressure points comprises the computing unit choosing five maximum pressure values of five maximum pressure points from the plurality of pressure values of the plurality of pressure points, the computing unit calculating the circumcenter reference point of the triangle formed by the at least three maximum pressure points comprises the computing unit calculating a circumcenter reference point of the triangle formed by outermost three maximum pressure points of the five maximum pressure points, the computing unit calculating the at least three distance characteristic values and the at least three angle characteristic values corresponding to the at least three maximum pressure points comprises the computing unit calculating five distance characteristic values and five angle characteristic values corresponding to the five pressure points, wherein each distance characteristic value corresponds to a distance between each maximum pressure point and the circumcenter reference point, and each angle characteristic value corresponds to an angle included between lines connecting two adjacent maximum pressure points and the circumcenter reference point, the identification unit comparing the set of characteristic information with the at least three distance characteristic values and the at least three angle characteristic values comprises the identification unit comparing the set of characteristic information with the five distance characteristic values and the five angle characteristic values, and the identification unit identifying whether the first object corresponds to the second object according to the comparison between the set of characteristic information, the at least three distance characteristic values, and the at least three angle characteristic values comprises the identification unit identifying whether the first object corresponds to the second object according to a comparison between the set of characteristic information, the five distance characteristic values, and the five angle characteristic values.

According to the disclosure, the set of characteristic information comprises five predetermined distance characteristic values and five predetermined angle characteristic values, the identification unit comparing the set of characteristic information with the five predetermined distance characteristic values and the five distance characteristic values comprises the identification unit comparing the five predetermined distance characteristic values of the set of characteristic information with the five distance characteristic values and comparing the five predetermined angle characteristic values of the set of characteristic information with the five angle characteristic values, the identification unit identifying whether the first object corresponds to the second object according to the comparison between the set of characteristic information, the five distance characteristic values, and five angle characteristic values comprises the identification unit identifying whether the first object corresponds to the second object according to a comparison between the five predetermined distance characteristic values and the five distance characteristic values and a comparison between the five predetermined angle characteristic values and the five angle characteristic values.

The present invention is to provide the identification system and the method for identifying the object by sensing pressure values. It can obtain the geometric characteristics and weight information, so as to be bases for identifying objects and weight variations of the objects. If it is applied to the smart appliance, such as a smart refrigerator, it can identify the food and goods automatically and effectively by the identification mechanism of the geometric characteristics, and can notify the user to supply the food before the food is running out by the identification mechanism of the weight variation, so as to solve the conventional problem that it only can store initial information when the goods are put in the refrigerator, and the goods are running out without being supplied in time.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
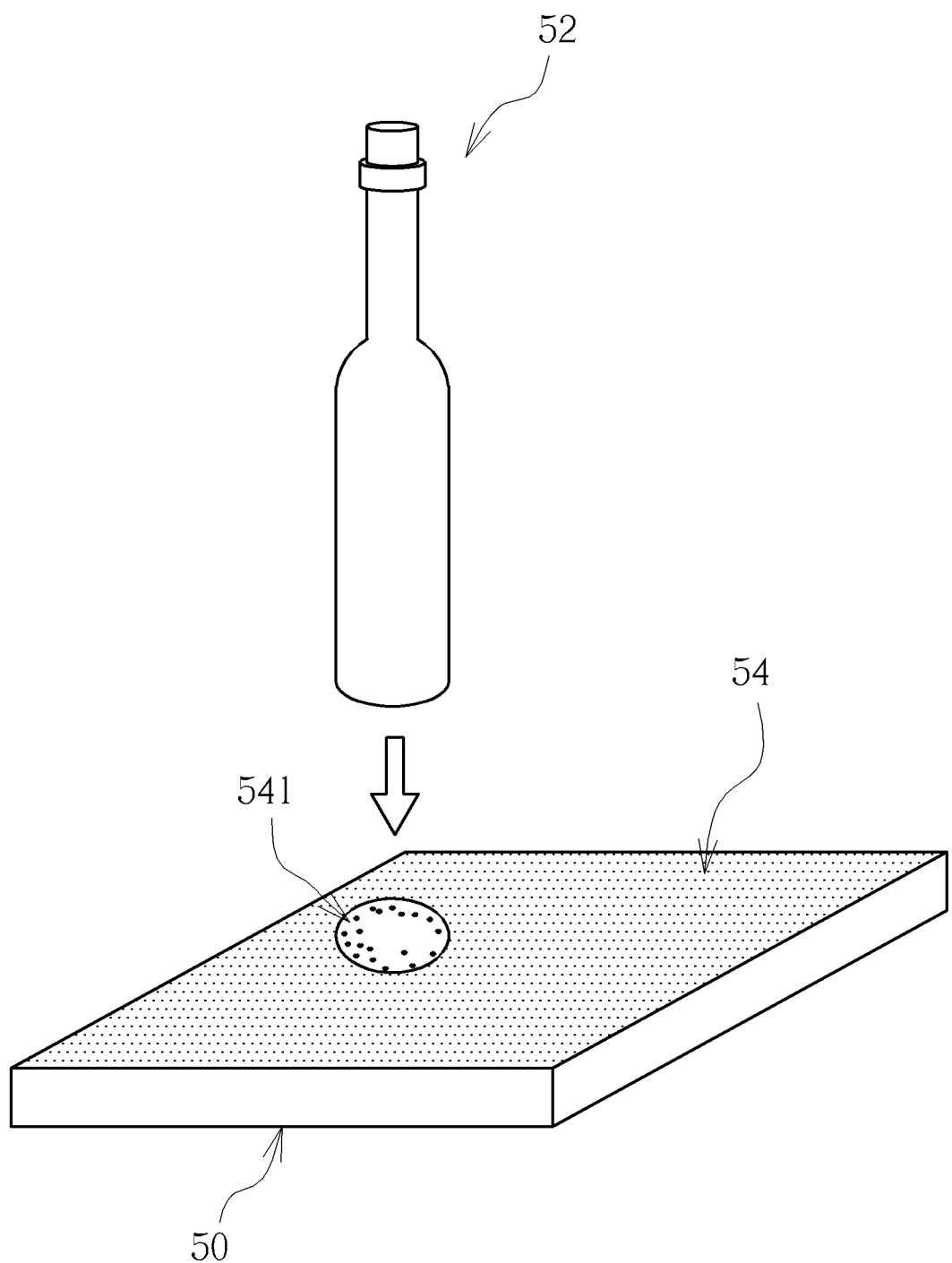
FIG. 1 is a diagram of an identification system according to an embodiment of the present invention.
Figure 2:
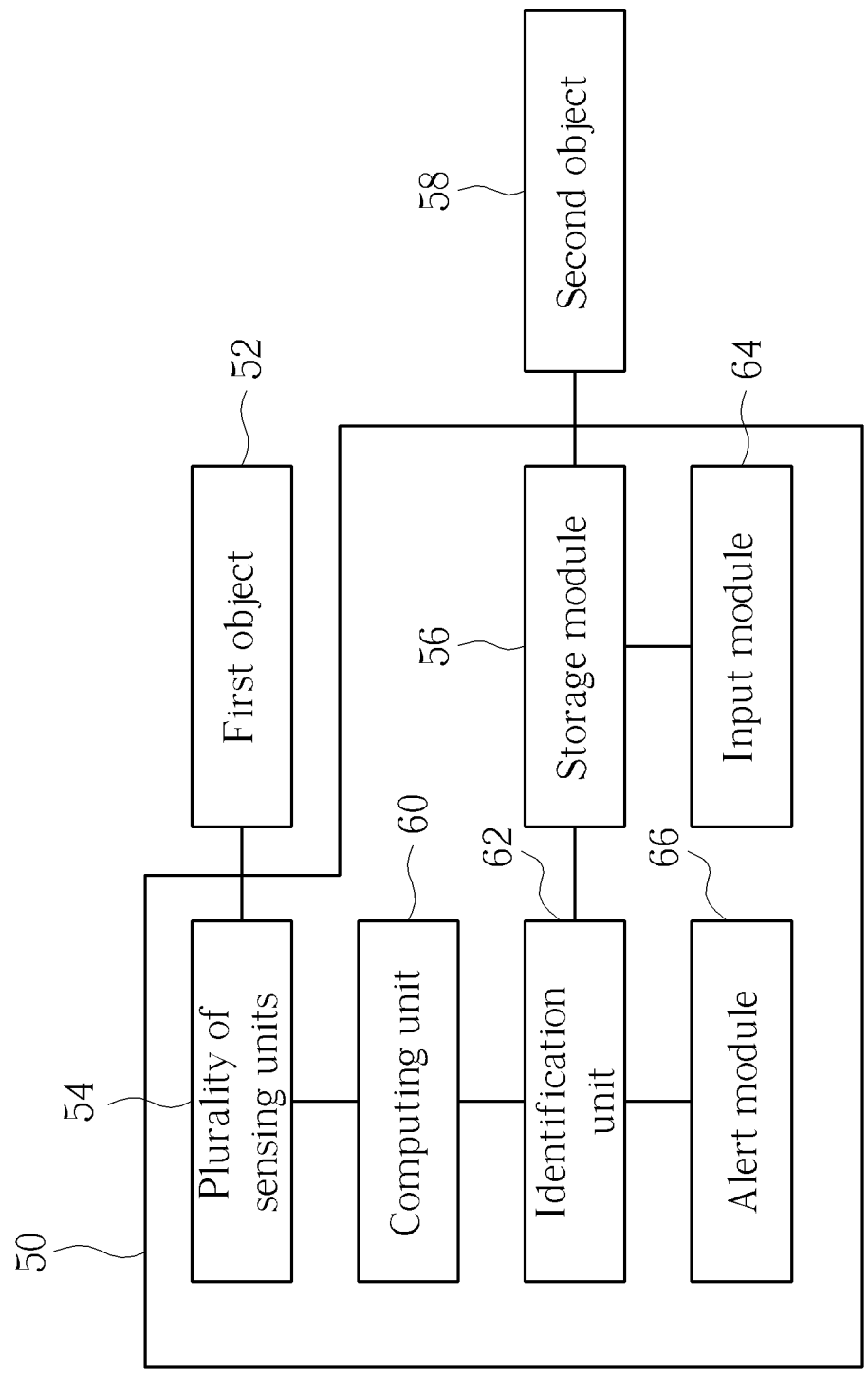
FIG. 2 is a functional block diagram of the identification system according to the embodiment of the present invention.

Please refer to FIG. 1 and FIG. 2. FIG. 1 is a diagram of an identification system 50 according to an embodiment of the present invention. FIG. 2 is a functional block diagram of the identification system 50 according to the embodiment of the present invention. The identification system 50 is for identifying related information of an object. For example, the identification system 50 can be applied to smart appliances, such as a smart refrigerator, so as to identify related information of food or goods contained inside the smart refrigerator. In this embodiment, the identification system 50 can be for identifying related information of a first object 52. The identification system 50 includes a plurality of sensing units 54. In this embodiment, the plurality of sensing units 54 can be a plurality of pressure sensors disposed on a pressure plate, and the pressure plate can be placed on a shelf inside the smart refrigerator. As shown in FIG. 1, because a bottom of the first object 52 may not be a flat plane, a plurality of pressure points 541 are generated by the first object 52 on the plurality of sensing units 54 as the first object 52 is disposed on the plurality of sensing units 54. At this time, the plurality of sensing units 54 is for sensing a plurality of pressure values of the plurality of pressure points 541 of the first object 52 disposed on the plurality of sensing units 54. The identification system 50 further includes a storage module 56 for storing a set of characteristic information of a second object 58. The set of characteristic information includes at least three predetermined distance characteristic values and at least three predetermined angle characteristic values. In this embodiment, the set of characteristic information can include five predetermined distance characteristic values DD1-DD5 and five predetermined angle characteristic values DA1-DA5, but not limited to it. For example, the set of characteristic information can include ten predetermined distance characteristic values and ten predetermined angle characteristic values.

Figure 3:
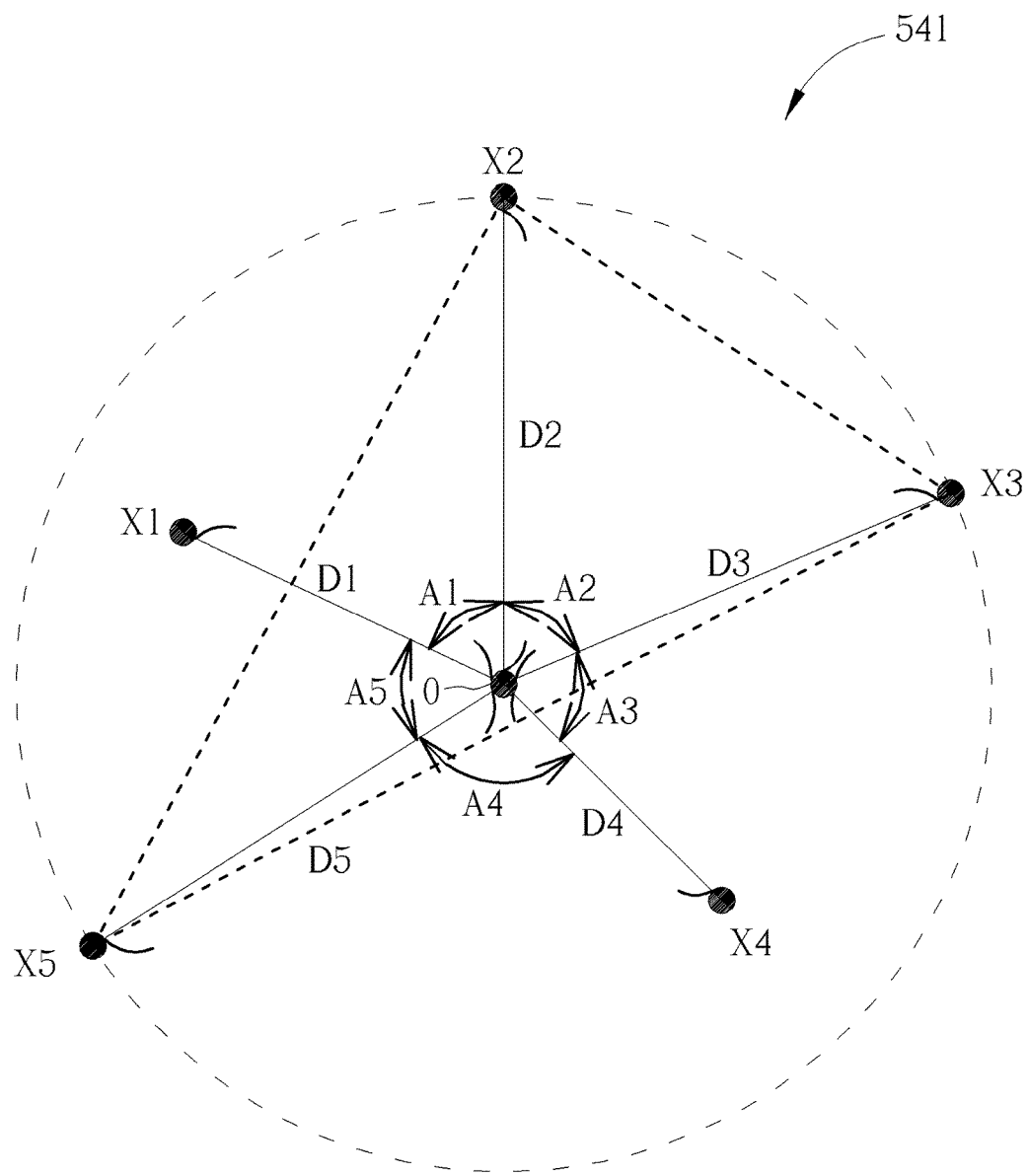
FIG. 3 is a diagram of a plurality of pressure points according to the embodiment of the present invention.

Please refer to FIG. 2 and FIG. 3. FIG. 3 is a diagram of the plurality of pressure points 541 according to the embodiment of the present invention. The identification system 50 further includes a computing unit 60 electrically connected to the plurality of sensing units 54. The computing unit 60 is for choosing at least three maximum pressure values of at least three maximum pressure points from the plurality of pressure values of the plurality of pressure points 541 after receiving the plurality of pressure values of the first object 52, so as to calculate a circumcenter reference point of a triangle formed by the at least three maximum pressure points to generate at least three distance characteristic values and at least three angle characteristic values corresponding to the at least three maximum pressure points. In this embodiment, the computing unit 60 can choose five maximum pressure values P1-P5 of five maximum pressure points X1-X5 after receiving the plurality of pressure values of the first object 52, so as to calculate a circumcenter reference point O of a triangle formed by outermost three maximum pressure points X2, X3 and X5 of the five maximum pressure points X1-X5 to generate five distance characteristic values D1-D5 and five angle characteristic values A1-A5 corresponding to the five maximum pressure points X1-X5. Each distance characteristic value corresponds to a distance between each maximum pressure point and the circumcenter reference point O, and each angle characteristic value corresponds to an angle included between lines connecting two adjacent maximum pressure points and the circumcenter reference point O. For example, the distance characteristic value D1 corresponds to a distance between the maximum pressure point X1 and the circumcenter reference point O, and the angle characteristic value A1 corresponds to an angle included between a line connecting the maximum pressure point X1 and the circumcenter reference point O and a line connecting the maximum pressure point X2 and the circumcenter reference point O, as shown in FIG. 3. Each distance characteristic value, at least three angle characteristic values and each maximum pressure value of each maximum pressure point can represent geometric characteristic information and weight information of the first object 52, so as to be bases for identifying objects and weight variations of the objects.

The identification system 50 further includes an identification unit 62 electrically connected to the storage module 56 and the computing unit 60. The identification unit 62 is for comparing the five predetermined distance characteristic values DD1-DD5 with the five distance characteristic values D1-D5 and for comparing the five predetermined angle characteristic values DA1-DA5 with the five angle characteristic values A1-A5, so as to identify whether the first object 52 corresponds to the second object 58. The identification system 50 of the present invention can further include an input module 64 for inputting the set of characteristic information corresponding to the first object 52. As the identification unit 62 determines that the first object 52 does not correspond to the second object 58, that is, the first object 52 is a new object which is not stored in a database of the storage module 56, a user can input related information of the new object, such as a manufacturing date, an expiration date, a brand, a manufacturer, and so on, by the input module 64.

Furthermore, the set of characteristic information stored in the storage module 56 can further include five predetermined pressure values DP1-DP5. As the identification unit 62 determines that the first object 52 corresponds to the second object 58, the identification unit 62 is further for comparing the five predetermined pressure values DP1-DP5 with the five maximum pressure values P1-P5, so as to identify weight variations of the first object 52. In addition, the identification system 50 further includes an alert module 66 electrically connected to the identification unit 62. The alert module 66 is for generating an alert message as a tolerance resulted from a comparison between the five predetermined pressure values DP1-DP5 with the five maximum pressure values P1-P5 by the identification unit 62 is greater than a predetermined weight tolerance. The alert message can be represented as an image, sounds, light, and so on. For example, it can display alert characters or alert light on a display panel. For example, as the first object 52 is a bottle of milk and a tolerance resulted from a comparison between the five predetermined pressure values DP1-DP5 with the five maximum pressure values P1-P5 by the identification unit 62 is greater than the predetermined weight tolerance, it means that weight of milk in the bottle is less than a specified percentage. At this time, the alert module 66 generates the alert message, so as to notify the user that milk is about to run out and needs to be purchased in the market.

Figure 4:
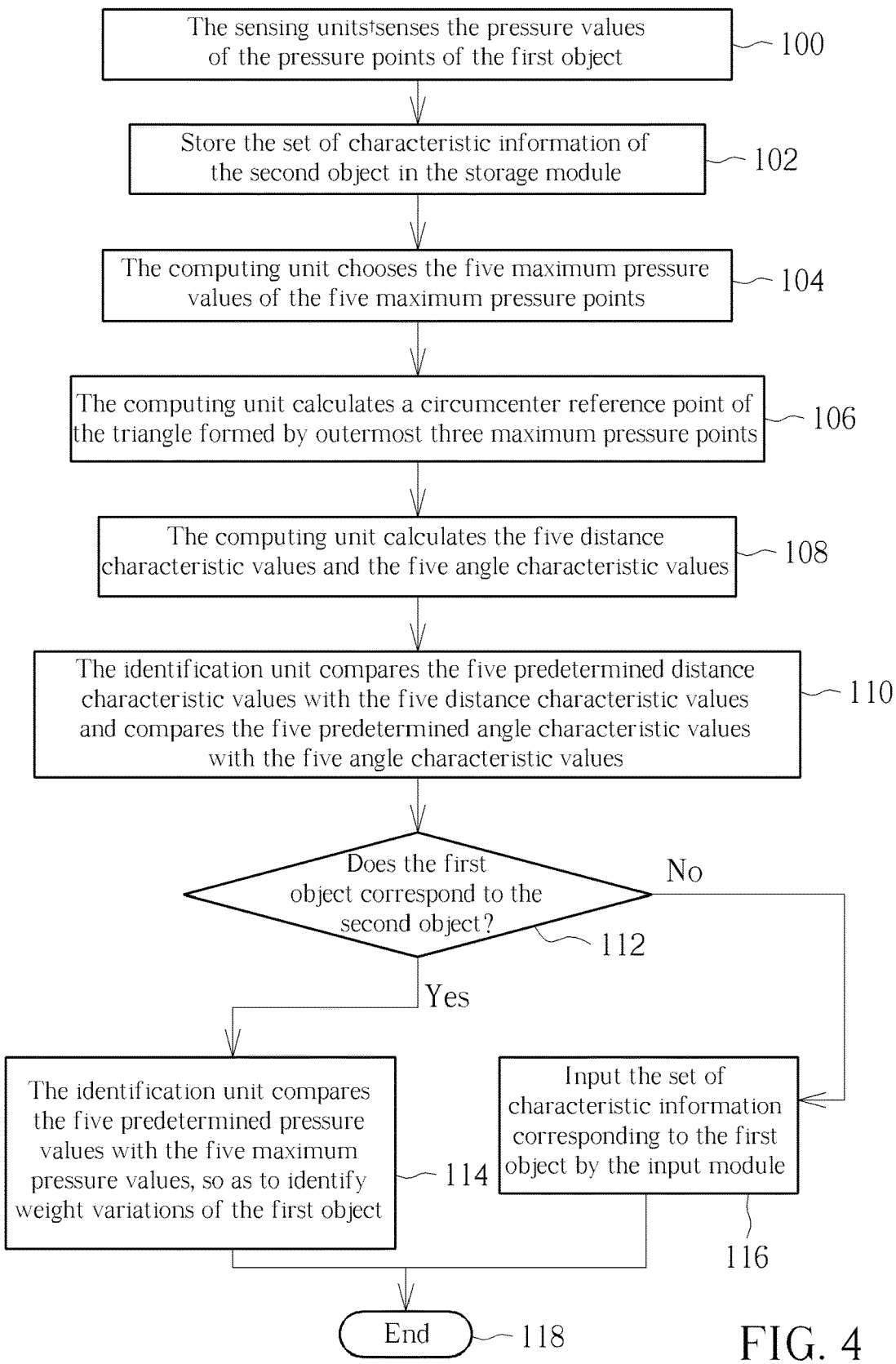
FIG. 4 is a flowchart for the identification system to identify the object according to the embodiment of the present invention.
Figure 5:
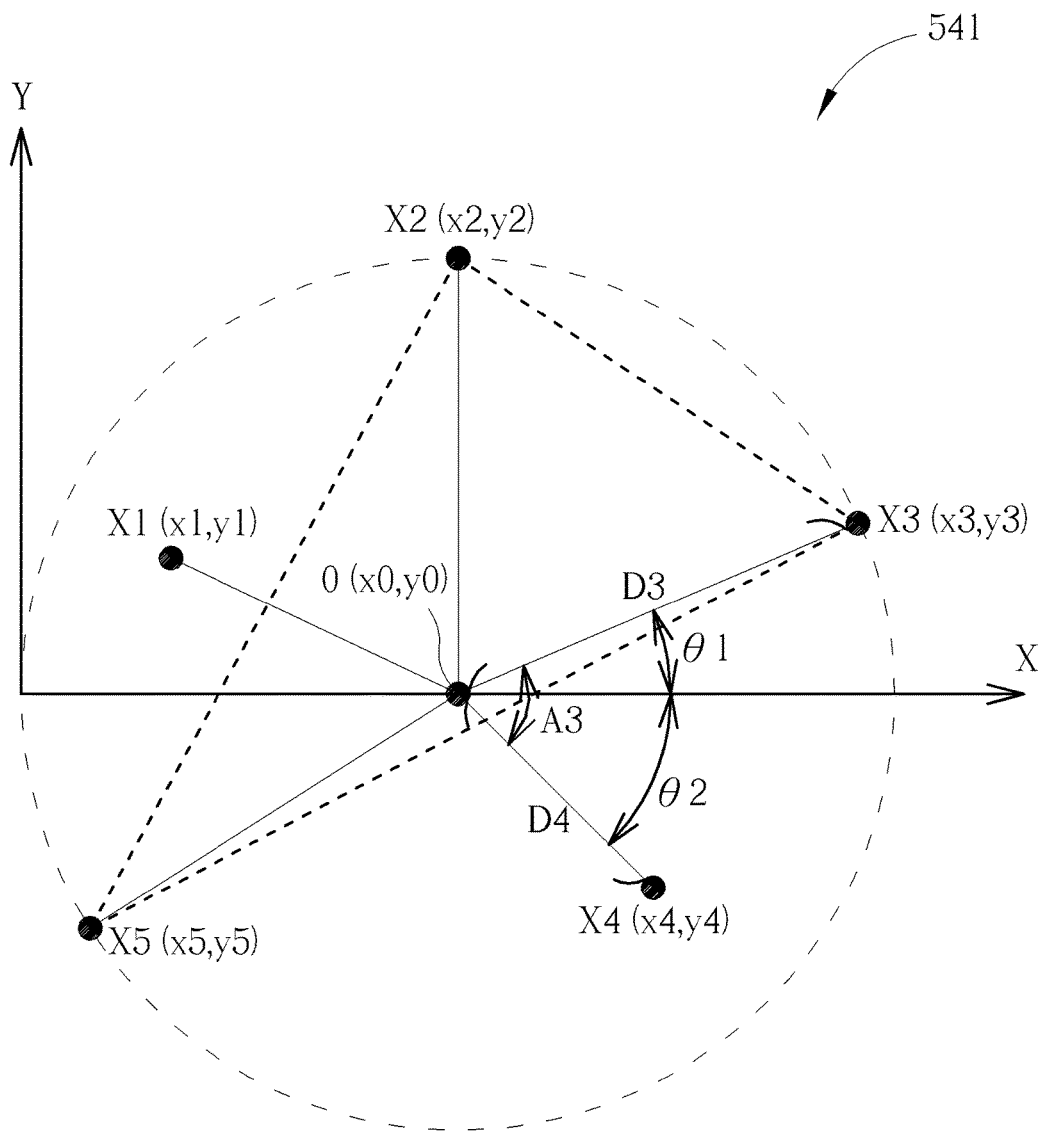
FIG. 5 is a coordinate diagram of the plurality of pressure points according to the embodiment of the present invention.

The method of the identification system 50 for identifying the object is described as follows. Please refer to FIG. 3 to FIG. 5. FIG. 4 is a flowchart for the identification system 50 to identify the object according to the embodiment of the present invention. FIG. 5 is a coordinate diagram of the plurality of pressure points 541 according to the embodiment of the present invention. The method includes following steps:

Step 100: The plurality of sensing units 54 senses the plurality of pressure values of the plurality of pressure points of the first object 52 disposed on the plurality of sensing units 54.

Step 102: Store the set of characteristic information of the second object 58 in the storage module 56.

Step 104: The computing unit 60 chooses the five maximum pressure values P1-P5 of the five maximum pressure points X1-X5 from the plurality of pressure values of the plurality of pressure points.

Step 106: The computing unit 60 calculates a circumcenter reference point O of the triangle formed by outermost three maximum pressure points of the five maximum pressure points X1-X5.

Step 108: The computing unit 60 calculates the five distance characteristic values D1-D5 and the five angle characteristic values A1-A5 corresponding to the five maximum pressure points X1-X5.

Step 110: The identification unit 62 compares the five predetermined distance characteristic values DD1-DD5 with the five distance characteristic values D1-D5 and compares the five predetermined angle characteristic values DA1-DA5 with the five angle characteristic values A1-A5.

Step 112: The identification unit 62 identifies whether the first object 52 corresponds to the second object 58 according to the comparison between the five predetermined distance characteristic values DD1-DD5 and the five distance characteristic values D1-D5 and the comparison between the five predetermined angle characteristic values DA1-DA5 and the five angle characteristic values A1-A5. As the first object 52 corresponds to the second object 58, go to step 114. As the first object 52 does not correspond to the second object 58, go to step 116.

Step 114: The identification unit 62 compares the five predetermined pressure values DP1-DP5 with the five maximum pressure values P1-P5, so as to identify weight variations of the first object 52.

Step 116: Input the set of characteristic information corresponding to the first object 52 by the input module 64.

Step 118: The end.

Detail description of previous steps is described herein. As the first object 52 is disposed on the plurality of sensing units 54, the plurality of sensing units 54 can sense the plurality of pressure values of the plurality of pressure points 541 of the first object 52. In addition, the user can input the set of characteristic information corresponding to the second object 58 by the input module 64 in advance, so as to store the set of characteristic information in the storage module 56, or the set of characteristic information corresponding to the second object 58 can be stored in the storage module 56 in the factory before delivery. The set of characteristic information can include the five predetermined distance characteristic values DD1-DD5 and the five predetermined angle characteristic values DA1-DA5. Then, the computing unit 60 can choose the five maximum pressure values P1-P5 of the five maximum pressure points X1-X5 from the plurality of pressure points 541 of the plurality of pressure values.

The computing unit 60 can calculate the circumcenter reference point O of the triangle formed by the outermost three maximum pressure points X2, X3 and X5 of the five maximum pressure points X1-X5. Because the plurality of sensing units 54 can be the plurality of pressure sensors disposed on a pressure plate, each plurality of sensing unit 54 corresponds to a coordinate value. For example, as shown in FIG. 5, the five maximum pressure points X1-X5 respectively correspond to coordinate (x1, y1) to (x5, y5), so that the outermost three maximum pressure points X2, X3 and X5 can be determined by the coordinate value of each pressure point. Lines connecting the outermost three maximum pressure points X2, X3 and X5 can form a triangle, as shown in FIG. 3. Then, the circumcenter reference point O and its coordinate value (x0, y0) can be determined by the coordinate values (x2, y2), (x3, y3), and (x5, y5) and a circumcenter formula. Next, the computing unit 60 can calculate the five distance characteristic values D1-D5 according to the coordinate values (x1, y1) to (x5, y5) corresponding to the five maximum pressure points X1-X5 and the coordinate value (x0, y0) of the circumcenter reference point O. For example, a formula of the distance characteristic value D1 of the maximum pressure point X1 is $D1=\sqrt{(x1-x0)^2+(y1-y0)^2}$. The five angle characteristic values can also be determined by the coordinate values and trigonometry. For example, as shown in FIG. 5, an angle θ1 included between a line connecting the maximum pressure point X3 and the circumcenter reference point O and X-axis can be determined by $$\theta 1 = \tan^{-1}\frac{(y3-y0)}{(x3-x0)},$$

and an angle θ2 included between a line connecting the maximum pressure point X4 and the circumcenter reference point O and X-axis can be determined by $$\theta 2 = \tan^{-1}\frac{(y4-y0)}{(x4-x0)},$$

so that the angle characteristic value A3 is equal to the sum of θ1 and θ2. The other distance characteristic values and angle characteristic values can be determined by the method described above, so that it is omitted herein.

After that, the identification unit 62 can compare the five predetermined distance characteristic values DD1-DD5 with the five distance characteristic values D1-D5 and compare the five predetermined angle characteristic values DA1-DA5 with the five angle characteristic values A1-A5. For example, the identification unit 62 can compare the five predetermined distance characteristic values DD1-DD5 with the five distance characteristic values D1-D5 and compare the five predetermined angle characteristic values DA1-DA5 with the five angle characteristic values A1-A5 by mean square error method. That is, a formula of tolerance De of the five predetermined distance characteristic values DD1-DD5 and the five distance characteristic values D1-D5 is:

$$De = \frac{\sqrt{\begin{array}{c}(DD1-D1)^2+(DD2-D2)^2+\\(DD3-D3)^2+(DD4-D4)^2+(DD5-D5)^2\end{array}}}{5},$$

and a formula of a tolerance Ae of the five predetermined angle characteristic values DA1-DA5 and the five angle characteristic values A1-A5 is:

$$Ae = \frac{\sqrt{\begin{array}{c}(DA1-A1)^2+(DA2-A2)^2+\\(DA3-A3)^2+(DA4-A4)^2+(DA5-A5)^2\end{array}}}{5}.$$

The method for calculating the tolerance De and the tolerance Ae is not limited to this embodiment, and it can depend on practical design demands. Then, the identification unit 62 can determine whether the first object 52 corresponds to the second object 58 according to the comparison between the five predetermined distance characteristic values DD1-DD5 and the five distance characteristic values D1-D5 and the comparison between the five predetermined angle characteristic values DA1-DA5 and the five angle characteristic values A1-A5. The identification unit 62 determines that the first object 52 corresponds to the second object 58 as the tolerances resulted from the comparison between the five predetermined distance characteristic values DD1-DD5 and the five distance characteristic values D1-D5 and the comparison between the five predetermined angle characteristic values DA1-DA5 and the five angle characteristic values A1-A5 by the identification unit 62 are respectively less than predetermined tolerances. For example, the predetermined tolerance of angle characteristic value can be set as 0.001 degree, and the predetermined tolerance of distance characteristic value can be set as 0.1 mm, so that the identification unit 62 determines that the first object 52 corresponds to the second object 58 as the tolerance Ae is less than 0.001 degree and the tolerance De is less than 0.1 mm.

As the identification unit 62 determines that the first object 52 corresponds to the second object 58, the identification unit 62 can continue to compare the five predetermined pressure values DP1-DP5 with the five maximum pressure values P1-P5, so as to identify the weight variations of the first object 52. As the first object 52 corresponds to the second object 58, the five predetermined pressure values DP1-DP5 of the set of characteristic information are exactly the information stored in the storage module 56 in advance. After comparing the five predetermined pressure values DP1-DP5 with the five maximum pressure values P1-P5, it can determine whether the weight of the first object 52 is changed. For example, as the five predetermined pressure values DP1-DP5 are greater than the five maximum pressure values P1-P5, it can be known that the weight of the first object 52 is decreased. In addition, the alert module 66 of the present invention can generate the alert message as the tolerance resulted from the comparison between the five predetermined pressure values DP1-DP5 with the five maximum pressure values P1-P5 by the identification unit 62 is greater than the predetermined weight tolerance. For example, the predetermined weight tolerance can be set as 90 percent of original weight of the first object 52. As a difference between the five predetermined pressure values DP1-DP5 and the five maximum pressure values P1-P5 is greater than the predetermined weight tolerance, it shows that the first object 52 is about to run out and needs to purchase.

Moreover, as the tolerance resulted from the comparison between the five predetermined distance characteristic values DD1-DD5 and the five distance characteristic values D1-D5 and the comparison between the five predetermined angle characteristic values DA1-DA5 and the five angle characteristic values A1-A5 by the identification unit 62 are greater than the predetermined tolerance, the identification unit 62 determines that the first object 52 does not correspond to the second object 58. For example, as Ae is greater than 0.001 degree and De is greater than 0.1 mm, the identification unit 62 determines that the first object 52 does not correspond to the second object 58. As the first object 52 does not correspond to the second object 58, it means that there is no any related information about the first object 52 stored in the storage module 56. At this time, the user can input the set of characteristic information corresponding to the first object 52 by the input module 64.

In addition, the plurality of sensing units 54 can be designed to sense a first set of the plurality of pressure values of the plurality of pressure points 541 of the first object 52 on a first time sequence and a second set of the plurality of the pressure values of the plurality of pressure points 541 of the first object 52 on a second time sequence, and the computing unit 60 can compute a difference between the first set of the plurality of pressure values and the second set of the plurality of pressure values. Then, the computing unit 60 can determine whether to choose the at least three maximum pressure values of the at least three maximum pressure points from the second set of the plurality of pressure values of the plurality of pressure points 541 according to the difference. That is, it can determine whether to perform previous identification procedure. By above steps, it can ensure that the identification procedure is performed after the first object 52 is disposed on the plurality of sensing units 54 statically, so as to increase the accuracy of identification. For example, it can be determined that the first object 52 is disposed on the plurality of sensing units 54 statically as the difference between the first set of the plurality of pressure values and the second set of the plurality of pressure values is less than 0.1 percent of the first set of the plurality of pressure values, so as to perform the following identification procedure.

In contrast to the prior art, the present invention is to provide the identification system and the method for identifying the object by sensing pressure values. It can obtain the geometric characteristics and weight information, so as to be bases for identifying objects and weight variations of the objects. If it is applied to the smart appliance, such as a smart refrigerator, it can identify the food and goods automatically and effectively by the identification mechanism of the geometric characteristics, and can notify the user to supply the food before the food is running out by the identification mechanism of the weight variation, so as to solve the conventional problem that it only can store initial information when the goods are put in the refrigerator, and the goods are running out without being supplied in time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A weight distribution identification system for identifying a weight distribution of an object, the weight distribution identification system comprising:
    a pressure plate for supporting a first object;
    a plurality of pressure sensors disposed on the pressure plate and for sensing a plurality of pressure values of a plurality of pressure points of the first object when the first object is placed on the pressure plate;
    a storage module for storing a set of characteristic information of a second object;
    a computing unit electrically connected to the plurality of pressure sensors for choosing at least three maximum pressure values of at least three maximum pressure points from the plurality of pressure values of the plurality of pressure points after receiving the plurality of pressure values of the first object, so as to calculate a circumcenter reference point of a triangle formed by the at least three maximum pressure points to generate at least three distance characteristic values and at least three angle characteristic values corresponding to the at least three maximum pressure points, wherein each distance characteristic value corresponds to a distance between each maximum pressure point and the circumcenter reference point, and each angle characteristic value corresponds to an angle included between lines connecting two adjacent maximum pressure points and the circumcenter reference point;
    an identification unit electrically connected to the storage module and the computing unit, the identification unit comparing the set of characteristic information with the at least three distance characteristic values and the at least three angle characteristic values, so as to identify whether the first object corresponds to the second object, the identification unit further comparing the set of characteristic information with the at least three maximum pressure values, so as to identify weight variations of the first object, as the identification unit determines that the first object corresponds to the second object; and
    an alert module electrically connected to the identification unit and for generating an alert message to show that the first object is about to run out or needs to be purchased as a tolerance resulted from a comparison between the set of characteristic information and the at least three maximum pressure values by the identification unit is greater than a predetermined weight tolerance, the alert message being represented as an image, sound, light, or an character.

2. The weight distribution identification system of claim 1, wherein the set of characteristic information comprises at least three predetermined distance characteristic values and at least three predetermined angle characteristic values, and the identification unit is further for comparing the at least three predetermined distance characteristic values with the at least three distance characteristic values and comparing the at least three predetermined angle characteristic values with the at least three angle characteristic values, so as to identify whether the first object corresponds to the second object.

3. The weight distribution of claim 1, wherein the identification unit determines that the first object corresponds to the second object as a tolerance resulted from a comparison between the set of characteristic information, the at least three distance characteristic values, and the at least three angle characteristic values by the identification unit is less than a predetermined tolerance.

4. The weight distribution of claim 3, wherein the set of characteristic information comprises at least three predetermined pressure values, and the identification unit compares the at least three predetermined pressure values with the at least three maximum pressure values, so as to identify the weight variations of the first object, as the identification unit determines that the first object corresponds to the second object.

5. The weight distribution identification system of claim 1, wherein the identification unit determines that the first object does not correspond to the second object as a tolerance resulted from a comparison between the set of characteristic information with the at least three distance characteristic values and the at least three angle characteristic values by the identification unit is greater than a predetermined weight tolerance.

6. The weight distribution identification system of claim 5, further comprising an input module for inputting the set of characteristic information corresponding to the first object as the identification unit determines that the first object does not correspond to the second object.

7. The weight distribution identification system of claim 1, further comprising an input module for inputting the set of characteristic information corresponding to the first object.

8. The weight distribution identification system of claim 1, wherein the computing unit is for choosing five maximum pressure values of five maximum pressure points after receiving the plurality of pressure values of the first object, so as to calculate a circumcenter reference point of a triangle formed by outermost three maximum pressure points of the five maximum pressure points to generate five distance characteristic values and five angle characteristic values corresponding to the five maximum pressure points, wherein each distance characteristic value corresponds to a distance between each maximum pressure point and the circumcenter reference point, and each angle characteristic value corresponds to an angle included between lines connecting two adjacent maximum pressure points and the circumcenter reference point.

9. The weight distribution identification system of claim 8, wherein the set of characteristic information comprises five predetermined distance characteristic values and five predetermined angle characteristic values, and the identification unit is further for comparing the five predetermined distance characteristic values with the five distance characteristic values and comparing the five predetermined angle characteristic values with the five angle characteristic values, so as to identify whether the first object corresponds to the second object.

10. The weight distribution identification system of claim 1, wherein the plurality of pressure sensors is further for sensing a first set of the plurality of pressure values of the first object on a first time sequence and a second set of the plurality of pressure values of the first object on a second time sequence, and the computing unit is further for computing a difference between the first set of the plurality of pressure values and the second set of the plurality of pressure values, so as to determine whether to choose the at least three maximum pressure values of the at least three maximum pressure points from the second set of the plurality of pressure values of the plurality of pressure points.

11. A method for identifying a weight distribution of an object, comprising:

disposing a plurality of pressure sensors on a pressure plate;

placing a first object on the pressure plate;

the plurality of pressure sensors sensing a plurality of pressure values of a plurality of pressure points of the first object placed on the pressure plate;

storing a set of characteristic information of a second object to a storage module;

a computing unit choosing at least three maximum pressure values of at least three maximum pressure points from the plurality of pressure values of the plurality of pressure points;

the computing unit calculating a circumcenter reference point of a triangle formed by the at least three maximum pressure points;

the computing unit calculating at least three distance characteristic values and at least three angle characteristic values corresponding to the at least three maximum pressure points, wherein each distance characteristic value corresponds to a distance between each maximum pressure point and the circumcenter reference point, and each angle characteristic value corresponds to an angle included between lines connecting two adjacent maximum pressure points and the circumcenter reference point;

an identification unit comparing the set of characteristic information with the at least three distance characteristic values and the at least three angle characteristic values;

the identification unit identifying whether the first object corresponds to the second object according to a comparison between the set of characteristic information, the at least three distance characteristic values, and the at least three angle characteristic values;

the identification unit further comparing the set of characteristic information with the at least three maximum pressure values, so as to identify weight variations of the first object according to a comparison between the set of characteristic information and the at least three maximum pressure values as the identification unit determines that the first object corresponds to the second object; and an alert module generating an alert message to show that the first object is about to run out or needs to be purchased as a tolerance resulted from the comparison between the set of characteristic information and the at least three maximum pressure values by the identification unit is greater than a predetermined weight tolerance, the alert message being represented as an image, sound, light, or an character.

12. The method of claim 11, wherein the set of characteristic information comprises at least three predetermined distance characteristic values and at least three predetermined angle characteristic values, the identification unit comparing the set of characteristic information with the at least three distance characteristic values and the at least three angle characteristic values comprises the identification unit comparing the at least three predetermined distance characteristic values of the set of characteristic information with the at least three distance characteristic values and comparing the at least three predetermined angle characteristic values of the set of characteristic information with the at least three angle characteristic values, and the identification unit identifying whether the first object corresponds to the second object according to the comparison between the set of characteristic information, the at least three distance characteristic values, and the at least three angle characteristic values comprises the identification unit identifying whether the first object corresponds to the second object according to a comparison between the three predetermined distance characteristic values with the at least three distance characteristic values and a comparison between the at least three predetermined angle characteristic values with the at least three angle characteristic values.

13. The method of claim 11, wherein the identification unit identifying whether the first object corresponds to the second object according to the comparison between the set of characteristic information, the at least three distance characteristic values and the at least three angle characteristic values comprises the identification unit determining that the first object corresponds to the second object as a tolerance resulted from a comparison between the set of characteristic information, the at least three distance characteristic values, and the at least three angle characteristic values by the identification unit is less than a predetermined tolerance.

14. The method of claim 13, wherein the set of characteristic information comprises at least three predetermined pressure values, and the identification unit further comparing the set of characteristic information with the at least three maximum pressure values, so as to identify the weight variations of the first object according to the comparison between the set of characteristic information and the at least three maximum pressure values as the identification unit determines that the first object corresponds to the second object further comprises the identification unit comparing the at least three predetermined pressure values of the set of characteristic information with the at least three maximum pressure values, so as to identify the weight variations of the first object according to a comparison between the at least three predetermined pressure values of the set of characteristic information and the at least three maximum pressure values as the identification unit determines that the first object corresponds to the second object.

15. The method of claim 11, wherein the identification unit identifying whether the first object corresponds to the second object according to the comparison between the set of characteristic information, the at least three distance characteristic values, and the at least three angle characteristic values comprises the identification unit determining that the first object does not correspond to the second object as a tolerance resulted from a comparison between the set of characteristic information with the at least three distance characteristic values and the at least three angle characteristic values by the identification unit is greater than a predetermined weight tolerance.

16. The method of claim 11, wherein the plurality of pressure sensors sensing the plurality of pressure values of the plurality of pressure points of the first object placed on the pressure plate comprises the plurality of pressure sensors sensing a first set of the plurality of pressure values of the first object on a first time sequence and a second set of the plurality of pressure values of the first object on a second time sequence, and the method further comprises:
the computing unit computing a difference between the first set of the plurality of pressure values and the second set of the plurality of pressure values; and
the computing unit determining whether to choose the at least three maximum pressure values of the at least three maximum pressure points from the second set of the plurality of pressure values of the plurality of pressure points according to the difference.

17. The method of claim 11, wherein the computing unit choosing the at least three maximum pressure values of the at least three maximum pressure points from the plurality of pressure values of the plurality of pressure points comprises the computing unit choosing five maximum pressure values of five maximum pressure points from the plurality of pressure values of the plurality of pressure points, the computing unit calculating the circumcenter reference point of the triangle formed by the at least three maximum pressure points comprises the computing unit calculating a circumcenter reference point of the triangle formed by outermost three maximum pressure points of the five maximum pressure points, the computing unit calculating the at least three distance characteristic values and the at least three angle characteristic values corresponding to the at least three maximum pressure points comprises the computing unit calculating five distance characteristic values and five angle characteristic values corresponding to the five pressure points, wherein each distance characteristic value corresponds to a distance between each maximum pressure point and the circumcenter reference point, and each angle characteristic value corresponds to an angle included between lines connecting two adjacent maximum pressure points and the circumcenter reference point, the identification unit comparing the set of characteristic information with the at least three distance characteristic values and the at least three angle characteristic values comprises the identification unit comparing the set of characteristic information with the five distance characteristic values and the five angle characteristic values, and the identification unit identifying whether the first object corresponds to the second object according to the comparison between the set of characteristic information, the at least three distance characteristic values, and the at least three angle characteristic values comprises the identification unit identifying whether the first object corresponds to the second object according to a comparison between the set of characteristic information, the five distance characteristic values, and the five angle characteristic values.

18. The method of claim 17, wherein the set of characteristic information comprises five predetermined distance characteristic values and five predetermined angle characteristic values, the identification unit comparing the set of characteristic information with the five predetermined distance characteristic values and the five distance characteristic values comprises the identification unit comparing the five predetermined distance characteristic values of the set of characteristic information with the five distance characteristic values and comparing the five predetermined angle characteristic values of the set of characteristic information with the five angle characteristic values, the identification unit identifying whether the first object corresponds to the second object according to the comparison between the set of characteristic information, the five distance characteristic values, and five angle characteristic values comprises the identification unit identifying whether the first object corresponds to the second object according to a comparison between the five predetermined distance characteristic values and the five distance characteristic values and a comparison between the five predetermined angle characteristic values and the five angle characteristic values.

* * * * *